Aug. 10, 1943.  J. A. LIGNIAN  2,326,372
IMPREGNATING METHOD
Original Filed July 13, 1939
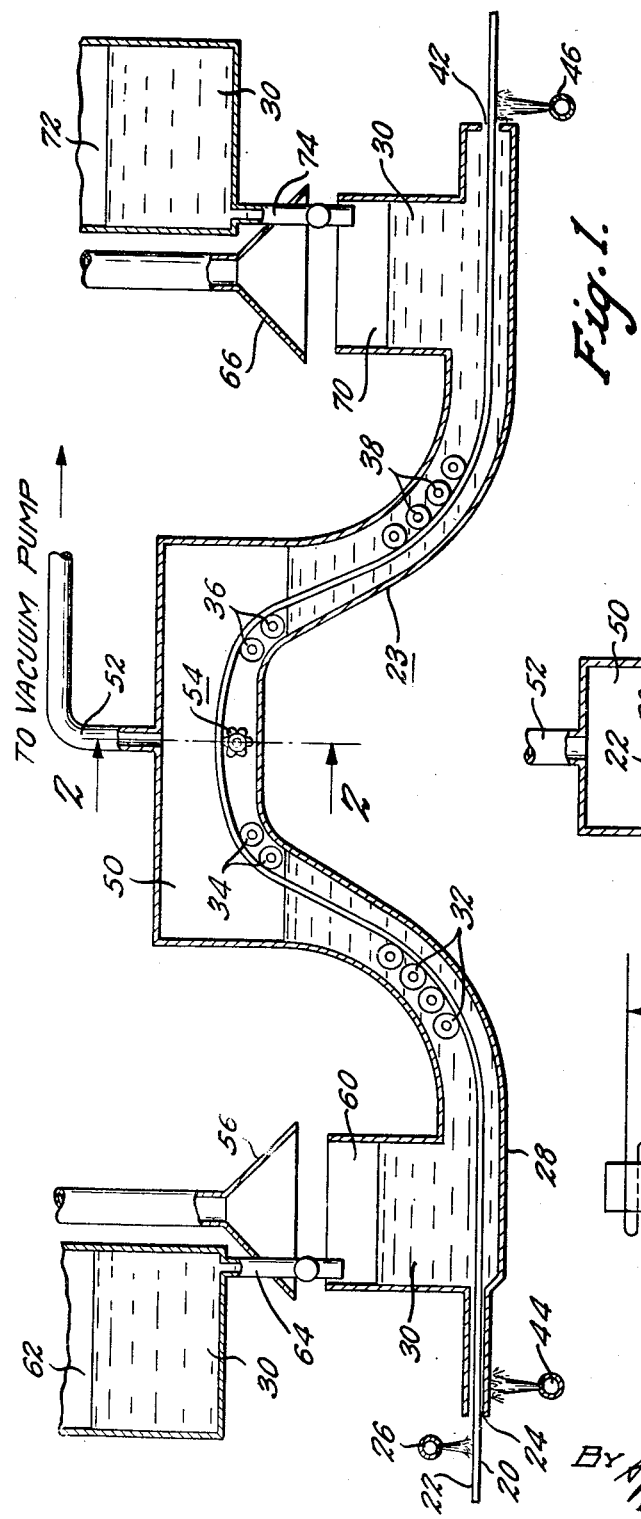
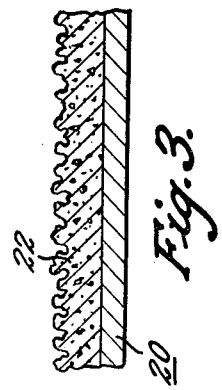
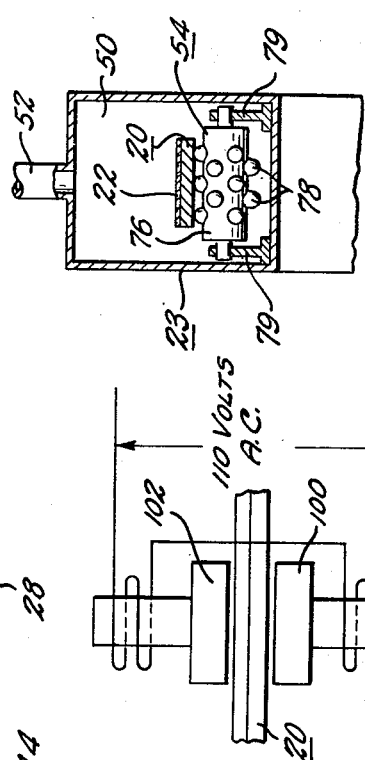
INVENTOR
Jean A Lignian
By Spencer Hardman &c.
HIS ATTORNEYS Patented Aug. 10, 1943

2,326,372

UNITED STATES PATENT OFFICE 2,326,372

IMPREGNATING METHOD

Jean A. Lignian, Dayton, Ohio, assignor to General Motors Corporation, Detroit, Mich., a corporation of Delaware Original application July 13, 1939, Serial No. 284,222. Divided and this application November 14, 1940, Serial No. 365,644

3 Claims. (Cl. 117—114)

This invention relates to an impregnating apparatus and is particularly concerned with the method and apparatus for continuously impregnating porous strip material.

An object of the invention is to provide a method and apparatus for continuously impregnating porous metal strip material wherein the strip is mechanically operated upon for dislodging occluded air in the porous structure thereof during the impregnating operation.

In carrying out the above object it is a further object, in some cases, to vibrate the strip for dislodging occluded air in the porous structure thereof.

Further objects and advantages of the present invention will be apparent from the following description, reference being had to the accompanying drawing wherein a preferred embodiment of the present invention is clearly shown.

In the drawing:

Fig. 1 is a cross-sectional view of a preferred type of impregnating apparatus.

Fig. 2 is a sectional view taken along the lines 2—2 of Fig. 1.

Fig. 3 is a fragmentary enlarged view of a continuous strip of metal having a sintered highly porous metal layer bonded thereto, and Fig. 4 is a view showing another type of vibration mechanism.

Referring to the drawing and more specifically to Fig. 1, a continuous metal strip 20 having a sintered highly porous metal layer 22 bonded thereto is inserted into an elongated opening 24 in an impregnating apparatus 23. Adjacent the opening 24 and directly above the continuous strip 20 is a flux spraying jet 26 which ejects a continuous stream of flux against the sintered highly porous metal layer 22 on the strip 20.

A leg 28 of the impregnating apparatus 23 contains molten babbitt, or any suitable molten bearing metal or composition 30, into which the continuous strip 20 is passed after going through opening 24. While passing through the molten babbitt the sintered highly porous metal layer 22 on strip 20 soaks up and becomes impregnated with the bearing material 30. The strip 20 then passes under a set of rollers 32 and over a second set of rollers 34 into a vacuum dome 50, which is evacuated by a vacuum pump, not shown, through the conduit 52. Upon entering the vacuum dome 50 the strip 20 is mechanically operated upon by a vibrating means 54, said vibrating means being motivated in a suitable manner to rotate at high speeds and to vibrate the strip 20 in such a manner as to dislodge any occluded air in the porous metal layer on strip 20. From the vibrator 54, the strip 20 passes over rollers 36 and under rollers 38 into leg 40 where it again enters the bath of molten bearing material, and the highly porous metal layer is further impregnated. The strip 20 leaves the impregnating apparatus through an opening 42 provided therefor in the leg 40. It will be noted that the rollers 32, 34, 36 and 38 are so arranged as to permit the passage of strip material which may be of relatively heavy or of thick cross section. In this manner continuous strips of any desirable weight or thickness may be impregnated without permanent deformation.

In order to prevent the molten bearing material 30 from flowing through the openings 24 and 42 in the legs 28 and 40, respectively, of the impregnating apparatus 23, there have been provided water cooling jets 44 and 46 adjacent the openings 24 and 42, which cooling jets cause a cool spray to be directed against the impregnating device near their respective openings to substantially freeze the molten babbitt, thereby preventing its outward flow through the said openings.

A reservoir 60 is provided in the leg 28, which reservoir contains the excess molten babbitt 30 and is supplied from a tank 62 through conduit 64. Likewise, a similar reservoir 70 is provided in the leg 40 and also contains the molten babbitt 30 and in this instance is supplied from a tank 72 through conduit 74. It is to be understood, however, that reservoirs 60 and 70 may be connected by a conduit, thereby eliminating supply tank 72 and its conduit 74. Hoods 56 and 66 have been provided over reservoirs 60 and 70 respectively to carry off obnoxious vapors. The entire apparatus 23 is maintained at an elevated temperature above the melting point of the impregnant, in the present instance 700° F. for a 625° M. P. babbitt. The heating can be accomplished by any conventional method.

It will be observed that the level of the molten babbitt in dome 50 is somewhat higher than that in reservoirs 60 and 70. This is due to the fact that dome 50 is substantially completely evacuated by the vacuum pump, and the fact that the molten babbitt in reservoirs 60 and 70 is exposed to atmospheric pressure. In this instance the babbitt level in dome 50 is approximately 2.97 feet higher than that in reservoirs 60 and 70 at standard conditions at sea level, due to the specific gravity of the babbitt which is about 11.43.

It will further be noted that when the strip 20 enters the vacuum dome 50, it has been raised out of the molten bearing material by its passage over rollers 34, vibrator 54 and rollers 36, and does not re-enter the bath until it passes over and beyond rollers 36. By reason of this fact the strip 20 is entirely exposed on all sides as it is contacted by vibrator 54, thus assuring absolute dislodging of any occluded air in the sintered highly porous metal layer 22, bonded to the strip 20 before it is further impregnated by the molten babbitt in leg 40.

Referring specifically to Fig. 2, one form of vibrator mechanism 54 is shown comprising a roller 76 having projections 78 thereon and disposed to vibrate strip 20 when the said strip contacts the projections in its passage through vacuum dome 50. The roller is fixed between a pair of uprights 79 in the impregnating apparatus 23, and is motivated by any suitable means to rotate at high speeds.

Fig. 4 shows a modified vibrator mechanism wherein a pair of electro-magnets 100 and 102 are positioned on either side of the strip 20. The magnets 100 and 102 are electrically connected in series and are energized from an A. C. source. Thus, due to the proximity of the strip and the change in direction of the current, the strip is vibrated between the magnets. The amplitude of stroke is controlled by the separation of the magnets while the frequency is directly controlled by the frequency of the A. C. source. The strip 20 with the layer 22 thereon can be formed in any suitable manner, one of such methods being disclosed in the Koehring Patent 2,198,253, April 23, 1940.

Still another modification utilizes a single magnetic solenoid which is energized by pulsating D. C. source which in turn mechanically vibrates the strip.

While the embodiment of the present invention as herein disclosed, constitutes a preferred form, it is to be understood that other forms might be adopted, all coming within the scope of the claims which follow.

This application is a division of application Serial No. 284,222 filed July 13, 1939, now Patent No. 2,293,840 dated Aug. 25, 1942.

What is claimed is as follows:

1. In a continuous method of impregnating porous metallic strip material, the steps comprising; immersing the porous strip material in an impregnating fluid, removing the strip material from the impregnating fluid in a chamber held at pressures less than atmospheric pressure, vibrating the strip in said chamber for removing occluded air from the porous material of the strip, and then further impregnating the strip by again immersing the strip in the impregnating fluid prior to exposure to atmospheric conditions.

2. In a continuous method of impregnating porous metallic strip material, the steps comprising; immersing porous strip material in an impregnating fluid and mechanically vibrating for dislodging the occluded air from the porous structure of the strip while simultaneously reducing the air pressure surrounding said strip, said steps taking place during a portion of said impregnation step only whereby the impregnated fluid will substantially completely fill the pores of the porous strip.

3. In a continuous method of impregnating porous metallic strip material, the steps comprising; immersing the porous strip in an impregnating fluid, evacuating the strip after partial impregnation thereof, simultaneously mechanically vibrating the strip to aid in removing occluded air therefrom and again immersing the evacuated strip in the impregnating fluid a portion of which is maintained at atmospheric pressure whereby substantially complete impregnation of the porous strip material is accomplished.

JEAN A. LIGNIAN.